United States Patent
Fujii et al.

(10) Patent No.: US 11,280,434 B2
(45) Date of Patent: Mar. 22, 2022

(54) RESIN TUBE FITTING

(71) Applicant: NIPPON PILLAR PACKING CO., LTD., Osaka (JP)

(72) Inventors: Makoto Fujii, Osaka (JP); Masaki Miyamoto, Osaka (JP); Tatsuya Fujii, Osaka (JP); Toshihide Iida, Osaka (JP); Tomoyuki Koike, Osaka (JP); Shintaro Makihata, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 256 days.

(21) Appl. No.: 16/334,150

(22) PCT Filed: Jun. 15, 2017

(86) PCT No.: PCT/JP2017/022143
§ 371 (c)(1),
(2) Date: Mar. 18, 2019

(87) PCT Pub. No.: WO2018/066179
PCT Pub. Date: Apr. 12, 2018

(65) Prior Publication Data
US 2019/0203858 A1   Jul. 4, 2019

(30) Foreign Application Priority Data

Oct. 3, 2016 (JP) .............................. JP2016-195428
Oct. 3, 2016 (JP) .............................. JP2016-195429

(51) Int. Cl.
*F16L 19/028* (2006.01)
*F16L 47/04* (2006.01)

(52) U.S. Cl.
CPC ............. *F16L 19/028* (2013.01); *F16L 47/04* (2013.01); *F16L 47/041* (2019.08)

(58) Field of Classification Search
CPC ....... F16L 47/04; F16L 47/041; F16L 19/041; F16L 19/005; F16L 19/028; F16L 19/0823; F16L 2201/10
USPC ..................................... 285/331, 334.5, 423
See application file for complete search history.

(56) References Cited

U.S. PATENT DOCUMENTS

| | | | |
|---|---|---|---|
| 5,388,871 A | 2/1995 | Saitoh | |
| 5,743,572 A | 4/1998 | Nishio | |

(Continued)

FOREIGN PATENT DOCUMENTS

| | | |
|---|---|---|
| DE | 3310034 A1 | 9/1984 |
| EP | 1 041 330 A1 | 10/2000 |

(Continued)

OTHER PUBLICATIONS

Combined Chinese Office Action and Search Report dated Apr. 24, 2020, in Patent Application No. 201780054099.5 (with English translation), 13 pages.

(Continued)

*Primary Examiner* — Zachary T Dragicevich
(74) *Attorney, Agent, or Firm* — Oblon, McClelland, Maier & Neustadt, L.L.P.

(57) ABSTRACT

A resin tube fitting has: a body with an outer sleeve; an inner ring including an insert portion insertable into the outer sleeve to contact the outer sleeve radially, and a press-in portion configured to be pressed into a longitudinal end of the tube; and a union nut configured to be engageable with the body. The body and the inner ring are made of resin, which has a property of contracting in response to change in ambient temperature. A radial contraction rate of the outer sleeve of the body is designed to be higher by 0.09% or more than that of the insert portion of the inner ring.

4 Claims, 10 Drawing Sheets

(56) References Cited

U.S. PATENT DOCUMENTS

| | | | |
|---|---|---|---|
| 6,045,164 A * | 4/2000 | Nishio | F16L 19/041 285/331 |
| 6,089,621 A * | 7/2000 | Nishio | F16L 19/041 285/331 |
| 6,896,299 B1 * | 5/2005 | Nishio | F16L 47/041 285/331 |
| 2002/0167169 A1 | 11/2002 | Nishio | |
| 2006/0157975 A1 * | 7/2006 | Fujii | F16L 19/028 |
| 2016/0061360 A1 | 3/2016 | Fujii et al. | |
| 2016/0076686 A1 | 3/2016 | Fujii et al. | |
| 2017/0146161 A1 | 5/2017 | Fujii et al. | |
| 2017/0159854 A1 | 6/2017 | Fujii et al. | |

FOREIGN PATENT DOCUMENTS

| | | |
|---|---|---|
| EP | 1 262 702 A1 | 12/2002 |
| EP | 2 995 838 A1 | 3/2016 |
| EP | 3 001 086 A1 | 3/2016 |
| JP | 49-9784 | 3/1974 |
| JP | 60-175983 U | 11/1985 |
| JP | 61-179481 U | 11/1986 |
| JP | 10-54489 A | 2/1998 |
| KR | 10-2002-0092172 A | 12/2002 |
| WO | WO 2016/052222 A1 | 4/2016 |
| WO | WO 2016/052223 A1 | 4/2016 |

OTHER PUBLICATIONS

South Korean Office Action dated May 14, 2020 in Patent Application No. 10-2019-7006665 (with English translation), 8 pages.

Extended European Search Report dated Jun. 17, 2020 in Patent Application No. 17858019.7, 8 pages.

International Search Report dated Sep. 5, 2017 in PCT/JP2017/022143 filed Jun. 15, 2017.

* cited by examiner

FIG.2

| | | EMBODIMENT 1 | | | EMBODIMENT 2 | | |
|---|---|---|---|---|---|---|---|
| | | BEFORE HEATING (mm) | AFTER HEATING (mm) | CONTRA-CTION RATE (%) | BEFORE HEATING (mm) | AFTER HEATING (mm) | CONTRA-CTION RATE (%) |
| INNER RING | OUTER DIAMETER A OF INSERT PORTION | 22.21 | 22.21 | 0.00 | 22.20 | 22.20 | 0.00 |
| BODY | INNER DIAMETER B OF OUTER SLEEVE | 22.19 | 22.12 | 0.32 | 22.22 | 22.20 | 0.09 |

FIG.3

| | TARGET 1 | | | TARGET 2 | | | TARGET 3 | | | TARGET 4 | | |
|---|---|---|---|---|---|---|---|---|---|---|---|---|
| | BEFORE HEATING (mm) | AFTER HEATING (mm) | CONTRACTION RATE (%) | BEFORE HEAT. (mm) | AFTER HEAT. (mm) | CONT. RATE (%) | BEFORE HEAT. (mm) | AFTER HEAT. (mm) | CONT. RATE (%) | BEFORE HEAT. (mm) | AFTER HEAT. (mm) | CONT. RATE (%) |
| INNER RING A | 22.21 | 22.21 | 0.00 | 22.34 | 22.22 | 0.54 | 22.20 | 22.20 | 0.00 | 22.20 | 22.19 | 0.05 |
| BODY B | 22.10 | 22.10 | 0.00 | 22.19 | 22.12 | 0.32 | 22.22 | 22.22 | 0.00 | 22.22 | 22.20 | 0.09 |

FIG.4

| DIFFERENCE IN CONTRACTION RATE | EMBODIMENT 1 | EMBODIMENT 2 | TARGET 1 | TARGET 2 | TARGET 3 | TARGET 4 |
|---|---|---|---|---|---|---|
| B − A | 0.32 | 0.09 | 0.00 | -0.22 | 0.00 | 0.04 |

|  |  | EMBODIMENT 3 | | | EMBODIMENT 4 | | | EMBODIMENT 5 | | |
|---|---|---|---|---|---|---|---|---|---|---|
|  |  | BEFORE HEATING (mm) | AFTER HEATING (mm) | CONTRACTION RATE (%) | BEFORE HEATING (mm) | AFTER HEATING (mm) | CONTRACTION RATE (%) | BEFORE HEATING (mm) | AFTER HEATING (mm) | CONTRACTION RATE (%) |
| INNER RING | OUTER DIAMETER C OF INSERT PORTION | 22.28 | 22.23 | 0.22 | 22.20 | 22.19 | 0.05 | 22.20 | 22.19 | 0.05 |
| BODY | INNER DIAMETER D OF OUTER SLEEVE | 22.19 | 22.12 | 0.32 | 22.19 | 22.12 | 0.32 | 22.20 | 22.14 | 0.27 |

FIG.8

| | | TARGET 5 | | | TARGET 6 | | | TARGET 7 | | |
|---|---|---|---|---|---|---|---|---|---|---|
| | | BEFORE HEATING (mm) | AFTER HEATING (mm) | CONTRA-CTION RATE (%) | BEFORE HEATING (mm) | AFTER HEATING (mm) | CONTRA-CTION RATE (%) | BEFORE HEATING (mm) | AFTER HEATING (mm) | CONTRA-CTION RATE (%) |
| INNER RING | C | 22.34 | 22.22 | 0.54 | 22.28 | 22.23 | 0.22 | 22.20 | 22.19 | 0.05 |
| BODY | D | 22.19 | 22.12 | 0.32 | 22.20 | 22.14 | 0.27 | 22.22 | 22.20 | 0.09 |

FIG.9

| DIFFERENCE IN CONTRACTION RATE | EMBODIMENT 3 | EMBODIMENT 4 | EMBODIMENT 5 | TARGET 5 | TARGET 6 | TARGET 7 |
|---|---|---|---|---|---|---|
| D − C | 0.09 | 0.27 | 0.22 | -0.22 | 0.05 | 0.04 |

RESIN TUBE FITTING

TECHNICAL FIELD

The invention relates to resin tube fittings.

BACKGROUND ART

A kind of resin tube fittings is known, which is usable in manufacturing devices in technical fields of manufacture of semiconductors, medical devices, and drugs, food processing, and chemical industry. See, e.g., Patent Literature 1. The kind of resin tube fittings is used for connecting tubes for transporting fluid such as ultrapure water and chemicals to other tubes or devices; the fittings are designed to be coupled to the tubes.

The resin tube fitting has a body, an inner ring, and a union nut, which are used for connecting the fitting to the tube. The inner ring is pressed into a longitudinal end of the tube, and then inserted into the body together with the longitudinal end of the tube. The union nut holds the longitudinal end of the tube to form a seal area between the inner ring and the body.

The resin tube fitting, during use in a manufacturing device, often undergoes heat cycle, for example, temperature change from a room temperature, e.g. about 20 degrees Celsius, to a high temperature, e.g. about 200 degrees Celsius, and then return to the room temperature. In order to maintain good capability to seal the gap between the body and the inner ring after being subject to the high temperature during use, the fitting needs to improve the sealing capability.

CITATION LIST

Patent Literature

Patent Literature 1: JP H10-54489 A

SUMMARY OF INVENTION

In view of the above-described problems, the invention aims at providing a resin tube fitting that can improve the capability to seal the gap between the body and the inner ring.

A resin tube fitting according to the invention is a fitting connectable to a tube. The fitting includes: a body with an outer sleeve; an inner ring including an insert portion insertable into the outer sleeve to contact the outer sleeve radially, and a press-in portion configured to be pressed into a longitudinal end of the tube; and a union nut configured to be engageable with the body to maintain the insert portion placed within the outer sleeve. The body and the inner ring are made of resin, which has a property of contracting in response to change in ambient temperature. A radial contraction rate of the outer sleeve of the body is designed to be higher by 0.09% or more than that of the insert portion of the inner ring.

With this structure, the fitting enables the outer sleeve of the body to radially contract greater than the insert portion of the inner ring when the body and the inner ring are cooled after heated by heat transfer from fluid flowing inside the body and the inner ring, i.e. when they have undergone the heat cycle, under the condition that the fitting is connected to the tube.

After the heat cycle, the outer sleeve of the body is deformed such that its inner diameter is reduced greater than the outer diameter of the insert portion of the inner ring. Thus, the fitting enables the sleeve of the body to be pressed onto the insert portion of the inner ring, which radially encloses the sleeve of the body.

As a result, the fitting can improve its capability to seal the gap between the sleeve of the body and the insert portion of the inner ring so that the capability can be maintained at a good level even after the fitting is subject to a temperature higher than a room temperature. In short, the fitting can improve the capability to seal the gap between the body and the inner ring.

According another aspect of the invention, the body and the inner ring may be made of the same kind of resin.

According still another aspect of the invention, the body and the inner ring may be made of different kinds of resin.

According a further aspect of the invention, the body has: a main sleeve from which the outer sleeve protrudes coaxially in a first axial direction; an inner sleeve placed radially inside the outer sleeve and protruding from the main sleeve coaxially with the outer sleeve in the first axial direction such that a tip of the inner sleeve is positioned nearer to the main sleeve than a tip of the outer sleeve; and a groove surrounded by the main sleeve, the outer sleeve, and the inner sleeve to have an opening at an end in the first axial direction. The inner ring allows the insert portion to be pressed into the groove such that a first seal area with radial seal action is formed between the insert portion and the inner sleeve when the insert portion is inserted into the outer sleeve.

With this structure, the fitting enables the outer sleeve of the body, when it contracts after the heat cycle, to press the insert portion of the inner ring, which is pressed into the groove, onto the inner sleeve of the body. Thus, the fitting can enhance the force of the insert portion and the inner sleeve to radially press each other.

Accordingly, the fitting can improve the seal performance of the first seal area formed between the inner sleeve of the body and the insert portion of the inner ring so that the seal performance can be maintained at a good level even after the fitting is subject to a temperature higher than a room temperature. As a result, the fitting can achieve the higher capability to seal the gap between the body and the inner ring.

The invention can provide the resin tube fitting that can improve the capability to seal the gap between the body and the inner ring.

DESCRIPTION OF EMBODIMENTS

The first embodiment of the invention will be explained with reference to the drawings.

Figure 1:
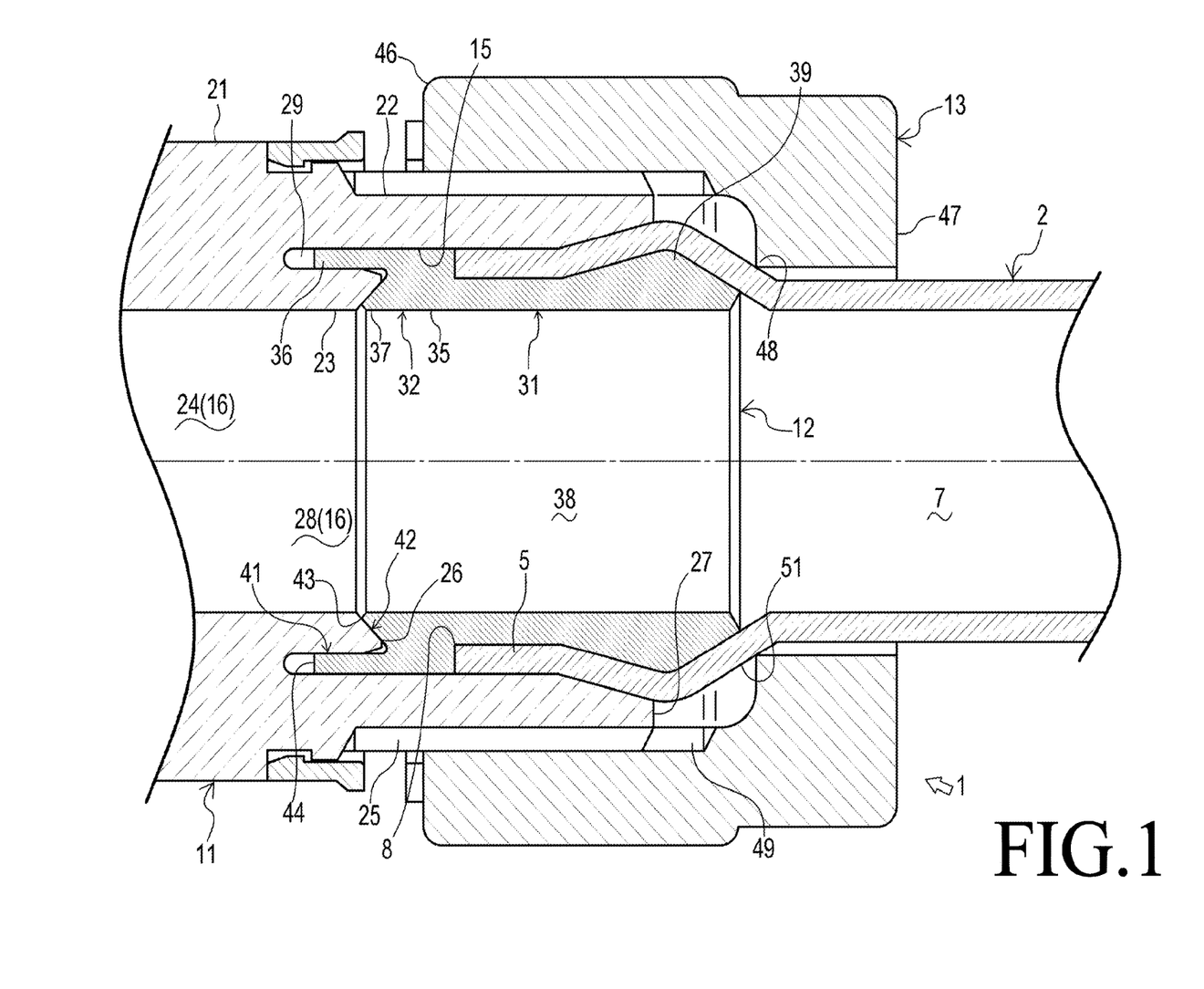
FIG. 1 is a cross-section view of the structure of a joint between a resin tube fitting according to the first embodiment of the invention and a longitudinal end of the tube.

A resin tube fitting 1 according to the first embodiment of the invention is usable in equipment of manufacture of semiconductor, liquid crystal, or organic electroluminescence devices. When used in such equipment, the fitting 1 is designed to be connectable to a tube 2, as shown in FIG. 1, to connect the tube 2 to another tube or a fluid device such as a valve and a pump.

The fitting 1 is connectable to the tube 2, while allowing a longitudinal end 5 of the tube 2 to be put inside the fitting 1. The fitting 1 has a body 11, an inner ring 12, and a union nut 13. The tube 2 is a flexible cylinder with approximately constant inner diameters, which is made of resin such as fluoropolymers.

Hereinafter, a first axial direction means a direction to the tube 2 in the fitting 1 shown in FIG. 1, and a second axial direction means a direction to the body 11 in the fitting 1 shown in FIG. 1.

The body 11 has a sleeve, which is an outer sleeve 22 described below; the sleeve allows the longitudinal end 5 of the tube 2 to be put therein. The body 11 also has a fluid channel 16, which is provided inside of the body 11 to connect to a fluid channel 7 of the tube 2 when the longitudinal end 5 of the tube 2 is put inside (an inlet 15 of) the sleeve 22.

The body 11 includes a main sleeve 21, an outer sleeve 22, and an inner sleeve 23. The main sleeve 21 has a circular-cylinder-shaped portion and a first fluid channel 24, which is connectable to the fluid channel 7 of the tube 2. The first fluid channel 24 has an approximately circular cross section, and runs inside the main sleeve 21 along its axis to serve as a part of the fluid channel 16.

The outer sleeve 22 has a thread engageable with the union nut 13 and protrudes coaxially from a first axial end of the main sleeve 21 to the first axial direction to form the inlet 15. The outer sleeve 22 is shaped as a circular cylinder with the inlet 15 inside. The thread, or external thread 25, extends at an outer periphery of the outer sleeve 22 along its axis.

The inner sleeve 23 is disposed at inner radiuses of the outer sleeve 22. The inner sleeve 23 has a tip 26, which protrudes coaxially from the first axial end of the main sleeve 21 to the same direction as the outer sleeve 22, i.e. to the first axial direction of the main sleeve 21, to be located nearer to the main sleeve 21 than a tip 27 of the outer sleeve 22.

The inner sleeve 23 is shaped as a circular cylinder that has approximately the same inner diameter as the main sleeve 21 and an outer diameter smaller than the inner diameter of the outer sleeve 22. The inner sleeve 23 also has a second fluid channel 28 connectable to the fluid channel 7 of the tube 2. The second fluid channel 28 has an approximately circular cross section and extends coaxially with the first fluid channel 24 to form the fluid channel 16 together with the first fluid channel 24.

The body 11 includes a groove 29 that is surrounded by the main sleeve 21, outer sleeve 22, and inner sleeve 23 to be open to the first axial direction. The groove 29 is shaped as a ring along the whole circumference of the outer periphery of the inner sleeve 23 to allow a second axial end of the inner ring 12, which is a plug 36 described below, to be pressed into the groove 29.

The inner ring 12 has an insert portion 32 insertable into the outer sleeve 22 to radially contact the outer sleeve 22 and a press-in portion 31 that can be pressed into the first longitudinal end 5 of the tube 2. The press-in portion 31 is provided to be, at least partially, insertable into the inlet 15 of the outer sleeve 22, i.e. inside the body 11, together with the insert portion 32 and the longitudinal end 5 of the tube 2, with an opening 8 inside which the press-in portion 31 is placed.

The insert portion 32 includes a cylinder 35, a plug 36, and a connector 37. The inner ring 12 has a fluid channel 38 that can connect the fluid channel 7 of the tube 2 to the fluid channel 16 of the body 11.

More specifically, the press-in portion 31 has an outer periphery of the same (circular cylindrical) shape as the inner periphery of the longitudinal end 5 of the tube 2 enlarged by the press-in portion 31. The press-in portion 31 is disposed on the first axial side of the inner ring 12. The press-in portion 31 has substantially the same inner diameter as the tube 2 (which is not enlarged by the press-in portion. Hereinafter, the same is true.) The press-in portion 31 encloses the first axial side of the fluid channel 38, which has an approximately circular cross section.

The press-in portion 31 has an outer diameter larger than the inner diameter of the tube 2. The press-in portion 31 is placed in contact with the whole circumference of the inner periphery of the longitudinal end 5 of the tube 2 and pressed into the opening 8 of the longitudinal end 5 of the tube 2 to enlarge it. The press-in portion 31 is held at a certain position relative to the longitudinal end of the tube 2.

While put inside the longitudinal end 5 of the tube 2, the press-in portion 31 is inserted into the inlet 15 of the outer sleeve 22, i.e. inside of the body 11, from the second axial side of the press-in portion 31, together with the longitudinal end 5 of the tube 2, so that the press-in portion 31 maintains its position relative to the longitudinal end 5.

When put inside the inlet 15 of the outer sleeve 22, the press-in portion 31 presses the longitudinal end 5 of the tube 2 onto the outer sleeve 22. In other words, the press-in portion 31 is placed in contact with the whole circumference and axial length of the longitudinal end 5 of the tube 2 from an inner radius, and in parallel, the outer sleeve 22 is placed in contact with the whole circumference and axial length of the longitudinal end 5 of the tube 2 from an outer radius.

The press-in portion 31 has an expanded portion 39, which is an annular protruding portion to improve the capability to seal the gap between the press-in portion 31 and the longitudinal end 5 of the tube 2 and prevent the tube 2 from being pulled out when the press-in portion 31 is put inside the longitudinal end 5 of the tube 2. The expanded portion 39 expands to outer radiuses of the inner ring 12 on the first axial side of the press-in portion 31.

The expanded portion 39 has a convex cross section with first and second outer peripheries, which are shaped as taper surfaces, placed at the first and second axial sides of the peak of the convex profile, i.e. a position of its largest radius. When the press-in portion 31 is pressed into the outer sleeve 22, the second outer periphery of the expanded portion 39 presses the first axial side of the longitudinal end 5 of the tube 2 onto the outer sleeve 22.

When the press-in portion 31 is pressed into the longitudinal end 5 of the tube 2, the insert portion 32 is placed outside the tube 2. The insert portion 32 is shaped as a cylinder and disposed on the second axial side of the inner ring 12. The insert portion 32 has substantially the same inner diameter as the press-in portion 31 and encloses the second axial side of the fluid channel 38.

The insert portion 32 has an outer diameter larger than the press-in portion 31. When the press-in portion 31 is to be inserted into the inlet 15 of the outer sleeve 22 together with the longitudinal end 5 of the tube 2, the insert portion 32 is inserted into the inlet 15 of the outer sleeve 22 before the press-in portion 31, and the whole circumference and axial length of the insert portion 32 contacts the outer sleeve 22 from an inner radius.

In the insert portion 32, the cylinder 35 is shaped as a circular cylinder and aligned coaxially with the second axial end of the press-in portion 31. The cylinder 35 has substantially the same inner diameter as the press-in portion 31 and the tube 2. The cylinder 35 has a fluid channel that is a part of the second axial end of the fluid channel 38.

The cylinder 35 has an outer diameter larger than the press-in portion 31 (except for the peak of the expanded portion 39 and its vicinity.) When the insert portion 32 is inserted into the inlet 15 of the outer sleeve 22, the cylinder 35, in particular, its whole periphery and axial length, approaches, contacts, or presses the outer sleeve 22 from an inner radius.

The plug 36 is shaped as a cylinder to be pressed in the groove 29 of the body 11 and protrudes from the cylinder 35 coaxially in the second axial direction. The inner diameter of the plug 36 is slightly smaller than the outer diameter of the inner sleeve 23 of the body 11, and the outer diameter of the plug 36 is approximately the same or slightly larger than that of the cylinder 35.

When the insert portion 32 is put inside the inlet 15 of the outer sleeve 22, the plug 36 is pressed in the groove 29 and presses the inner sleeve 23 from an outer radius to form a first seal area 41 between the plug 36 and the inner sleeve 23. In particular, the whole periphery and axial length of the plug 36 contacts the inner sleeve 23.

In parallel, the plug 36 contacts or presses the outer sleeve 22 from an inner radius. In particular, the whole periphery and axial length of the plug 36 contacts the outer sleeve 22.

The connector 37 is shaped as a cylinder, and disposed at a radius smaller than the plug 36. The connector 37 protrudes coaxially from the cylinder 35 in the same direction as the plug 36 (i.e. in the second axial direction from the cylinder 35) to be located nearer to the cylinder 35 than the tip 44 of the plug 36.

The connector 37 is shaped as a circular cylinder of approximately the same inner diameter as the cylinder 35 and the inner sleeve 23 of the body 11. The connector 37 has an outer diameter smaller than the inner diameter of the plug 36 to allow the tip 26 of the inner sleeve 23 to be placed between the connector 37 and the first axial end of the plug 36.

The connector 37, while restricting deformation and movement of the inner sleeve 23 toward inner radiuses caused by the plug 36 pressed into the groove 29, presses the inner sleeve 23 from the first axial direction to form a second seal area 42 between the connector 37 and the inner sleeve 23. The whole periphery of the connector 37 contacts the inner sleeve 23.

The union nut 13 is formed to be connectable to the body 11 so that it maintains the positions of the insert portion 32, at least part of the press-in portion 31, and the longitudinal end 5 of the tube 2 inside the outer sleeve 22. The union nut 13 has a through hole along the axis of the union nut 13; the through hole allows the tube 2 to penetrate therethrough.

There is an allowance between the union nut 13 and the tube 2 so that the union nut 13 can move relative to the tube 2 in the longitudinal direction of the tube 2, while the union nut 13 can be screwed to the outer sleeve 22 of the body 11 with the tube 2 put inside the hole. The union nut 13 has a connector 46 and a pressing portion 47.

The connector 46 can be screwed to an outer periphery of the body 11 to allow the longitudinal end 5 of the tube 2 to be placed radially between the connector 46 and the press-in portion 31, which is put inside the inlet 15 together with the longitudinal end 5 of the tube 2. Thus, the connector 46 connects the longitudinal end 5 of the tube 2 to the body 11.

The connector 46 includes, in addition to a part of the through hole, a thread engageable with the thread of the outer sleeve 22 of the body 11, i.e. the external thread 25. The connector 46 is shaped as a cylinder and disposed on the second axial side of the union nut 13. The thread of the connector 46, or internal thread 49, extends on the inner periphery of the connector 46 along its axial direction to be engaged with the thread of the outer sleeve 22 of the body 11.

When the internal thread 49 is engaged with the external thread 25 of the outer sleeve 22 of the body 11 and then moves to the second axial direction, the connector 46 radially encloses the outer sleeve 22 and presses, onto the press-in portion 31 of the inner ring 12, the outer sleeve 22 and the longitudinal end 5 of the tube 2, which is placed together with the press-in portion 31.

At that time, the connector 46 contacts the outer sleeve 22 in the whole periphery of an engagement area, in which the internal thread 49 is engaged with the external thread 25 of the outer sleeve 22. The connector 46 radially encloses the longitudinal end 5 of the tube 2, which is placed inside the inlet 15 of the outer sleeve 22, across the engagement area of the outer sleeve 22.

When the connector 46 is screwed to the external thread 25 of the outer sleeve 22, the pressing portion 47 presses the longitudinal end 5 of the tube 2 not only from the first axial direction onto the body 11, but also from an outer radius onto the press-in portion 31, which is put inside the inlet 15 together with the longitudinal end 5 of the tube 2.

The pressing portion 47 is shaped as a cylinder and disposed on the first axial side of the union nut 13. The pressing portion 47 is aligned coaxially with the connector 46 so that the inner periphery of the pressing portion 47 is located radially inside the inner periphery of the connector 46. The pressing portion 47 has an inner diameter smaller than the inner radius of the connector 46 and slightly larger than the outer diameter of the tube 2; the pressing portion 47 thus provides a residual part of the through hole.

When the connector 46 presses, onto the press-in portion 31 of the inner ring 12, the outer sleeve 22 and the longitudinal end 5 of the tube 2, which is placed inside the outer sleeve 22 together with the press-in portion 31, the pressing portion 47 is disposed outside the first axial end of the outer sleeve 22 and can press the longitudinal end 5 of the tube 2 onto the press-in portion 31.

More specifically, the inner periphery of the pressing portion 47 has a corner 48 on the second axial side. When the connector 46 is screwed to the external thread 25 of the outer sleeve 22, the corner 48 presses the longitudinal end 5 of the tube 2 not only from the first axial direction onto the body 11, but also from the outer radius onto the press-in portion 31. In short, the corner 48 holds the longitudinal end 5 of the tube 2 between the corner 48 and the press-in portion 31.

When the connector 46 is screwed to the external thread 25 of the outer sleeve 22, i.e. when the union nut 13 is fixed to the body 11 tightly, the corner 48 moves in the axial direction and presses an enlarged portion of the tube 2, which is enlarged by the expanded portion 39 and extends along the first outer periphery, like a wedge driven in the whole periphery of the enlarged portion.

The union nut 13 is made of certain resin, preferably, fluoropolymers such as perfluoroalkoxy alkanes (PFA), polytetrafluoroethylenes (PTFE), or ethylene tetrafluoroethylenes (ETFE).

The resin tube fitting 1 is formed with the above-described configuration. When the resin tube fitting 1 is connected to the tube 2, first the union nut 13 makes the tube 2 to penetrate with an allowance between the union nut 13 and the tube 2. Next, the inner ring 12 is connected to the tube 2. More specifically, the press-in portion 31 is pressed coaxially into the opening 8 of the longitudinal end 5 of the tube 2, while the expanded portion 39 enlarges the tube 2.

The insert portion 32 of the inner ring 12, which is located outside the tube 2, is then inserted into the inlet 15 of the outer sleeve 22, i.e. the inside of the resin tube fitting 1. Next, the press-in portion 31 and the longitudinal end 5 of the tube 2, inside which the press-in portion 31 is placed, are inserted into the inlet 15 of the outer sleeve 22. Finally, the connector 46 of the union nut 13 is screwed to the external thread 25 of the outer sleeve 22 and placed at a predetermined position near the body 11.

The union nut 13 is screwed such that the plug 36 can be pressed into the groove 29 to form the first seal area 41 with the radial sealing action, and the connector 37 can be pressed onto the inner sleeve 23 to form the second seal area 42 with the axial sealing action.

In addition, the body 11 and the inner ring 12 of the resin tube fitting 1 are made of the same kind of resins, which has a property of contracting in response to change in ambient temperature. A radial contraction rate of the outer sleeve 22 of the body 11 is designed to be higher by 0.09% or more than that of the insert portion 32, in particular the plug 36, of the inner ring 12.

The body 11 and the inner ring 12 are made of a certain resin, which is preferably fluoropolymers including, for example, PFA, PTFE, and ETFE.

The body 11 is heated by rise of ambient temperatures (including the temperature of fluid flowing inside the resin tube fitting 1) from a room temperature (approximately 25 degrees Celsius) by certain degrees, and then cooled by fall of the ambient temperature to the room temperature. When undergoing such a temperature change for the first time, the outer sleeve 22 can radially contract relative to its initial size.

The inner ring 12 is heated by rise of ambient temperature (including the temperature of fluid flowing inside the resin tube fitting 1) from a room temperature by certain degrees, and then cooled by fall of the ambient temperature to the room temperature. When undergoing such a temperature change for the first time, the insert portion 32 can radially contract relative to its initial size.

More specifically, the body 11 and the inner ring 12, including the outer sleeve 22 and the insert portion 32, expand from their initial sizes during heating, i.e. while they receive an amount of heat with rise in ambient temperature, and then contract to sizes smaller than their initial sizes during cooling, i.e. while they release heat with fall in ambient temperature.

The outer sleeve 22 of the body 11 is designed to radially contract greater than the insert portion 32 of the inner ring 12. 1

The body 11 and the inner ring 12 enable the outer sleeve 22 of the body 11 and the insert portion 32 of the inner ring 12 to have radial contraction rates different by whether the body 11 and the inner ring 12 are heat-treated during manufacture or not. The difference in radial contraction rate falls within a certain range.

The heat treatment is, for example, an annealing treatment to eliminate internal distortion from objects molded during manufacture of the body 11 or the inner ring 12. In the annealing treatment, the objects are heated at a certain temperature for a certain time (e.g., the objects made of PFA or PTFE are heated from about 200 degrees Celsius to about 250 degrees Celsius for about 180 minutes; the objects made of ETFE are heated from about 120 degrees Celsius to about 140 degrees Celsius for about 180 minutes.)

The insert portion 32 of the inner ring 12 is heat-treated to have the contraction rate of approximately zero after the temperature change, i.e. to hardly contract. The outer sleeve 22 of the body 11 is not heat-treated to have a contraction rate after the temperature change higher than the insert portion 32 of the inner ring 12.

The method of generating the difference in radial contraction rate between the outer sleeve 22 of the body 11 and the insert portion 32 of the inner ring 12 is not limited to the method in which one of the body 11 and the inner ring 12 is heat-treated but the other is not. For example, conditions may be appropriately adjusted during molding of the body 11 and the inner ring 12. In injection molding, different conditions such as injection pressure, holding pressure, injection rate, and mold temperature can vary properties of molded objects, such as its residual stress and density, and can cause different contraction rate of the objects. Accordingly, molding conditions different between the body 11 and the inner ring 12 can generate a significant difference in contraction rate therebetween, or difference of 0.09% or more.

In the present embodiment, the difference in radial contraction rate between the outer sleeve 22 of the body 11 and the insert portion 32 of the inner ring 12 is designed within a range from about 0.09% to about 10%. Preferably, the difference is selected within a range from about 0.09% to about 5%.

The above-described configuration enables the outer sleeve 22 of the body 11 to contract greater than the insert portion 32 of the inner ring 12 when the body 11 and the union nut 13, with the tube 2 connected to the resin tube fitting 1, are cooled after heated by heat transmitted from the fluid, i.e. have undergone the heat cycle.

After the heat cycle, the inner diameter of the outer sleeve 22 of the body 11 is reduced greater than the outer diameter of the insert portion 32 of the inner ring 12. Thus, the fitting 1 can press the outer sleeve 22 onto the insert portion 32, which radially overlap the outer sleeve 22.

Thus, the fitting 1 can improve its capability to seal the gap between the outer sleeve 22 of the body 11 and the insert portion 32 of the inner ring 12 so that the capability can be maintained at a good level even after the fitting 1 is subject to a temperature higher than a room temperature. In short, the fitting 1 can improve the capability to seal the gap between the body 11 and the inner ring 12.

As described above, the body 11 includes the main sleeve 21, the outer sleeve 22, the inner sleeve 23, and the groove 29. The outer sleeve 22 protrudes coaxially from the main sleeve 21 in the first axial direction. The inner sleeve 23 is disposed at inner radiuses of the outer sleeve 22 and protrudes coaxially from the main sleeve 21 to the same direction as the outer sleeve 22 such that the tip 26 of the inner sleeve 23 is located nearer to the main sleeve 21 than the tip 27 of the outer sleeve 22. The groove 29 is surrounded by the main sleeve 21, outer sleeve 22, and inner sleeve 23 to be open to the first axial direction.

When the insert portion 32 and at least part of the press-in portion 31 are put inside the outer sleeve 22, the inner ring 12 allows the insert portion 32, esp. the plug 36, to be pressed into the groove 29 to form the first seal area 41 with radial seal action between the insert portion 32, esp. the plug 36, and the inner sleeve 23.

Accordingly, the fitting 1 enables the outer sleeve 22 of the body 11, when it contracts after the heat cycle, to press the insert portion 32, esp. the plug 36, which is pressed into the groove 29, onto the inner sleeve 23. Thus, the fitting 1 can enhance the force of the insert portion 32 and the inner sleeve 23 to radially press each other.

Thus, the fitting 1 can improve the seal performance of the first seal area 41 formed between the inner sleeve 23 of the body 11 and the insert portion 32 of the inner ring 12, esp. the plug 36, so that the seal performance can be maintained at a good level even after the fitting 1 is subject to a temperature higher than a room temperature. As a result, the fitting 1 can improve the capability to seal the gap between the body 11 and the inner ring 12.

The above-described advantageous effects were confirmed by comparative experiments about seal performance. We started the comparative experiments by preparing examples 1 and 2 of the first embodiment of the invention and targets 1, 2, 3, and 4 for comparison; the targets have the same structure as the resin tube fitting 1, but their bodies and inner rings differ in difference in contraction rate from those according to the first embodiment of the invention.

Ambient temperatures of the examples 1 and 2 and the targets 1-4 were increased from a room temperature to about 200 degrees Celsius, and then kept at about 200 degrees Celsius for 1 hour. After that, the ambient temperatures were decreased from about 200 degrees Celsius to a room temperature, i.e. the examples 1 and 2 and the targets 1-4 were naturally cooled.

The heating and natural cooling were conducted for the examples 1 and 2 and the targets 1-4 before connected to tubes, i.e. with the bodies and inner rings separated from each other.

Figure 2:
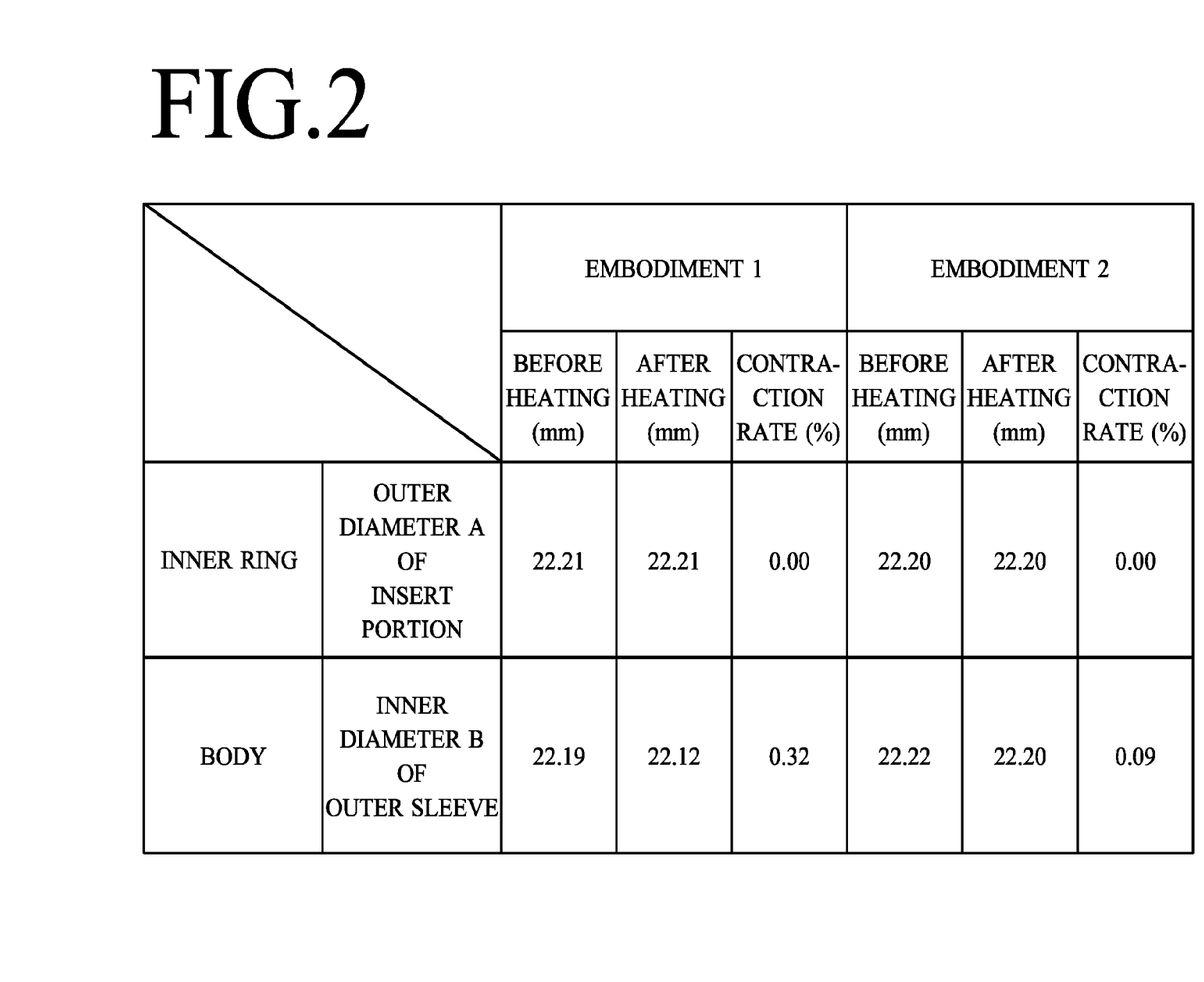
FIG. 2 is a drawing showing sizes of portions of inner rings and bodies in examples 1 and 2 according to the first embodiment of the invention.
Figure 3:
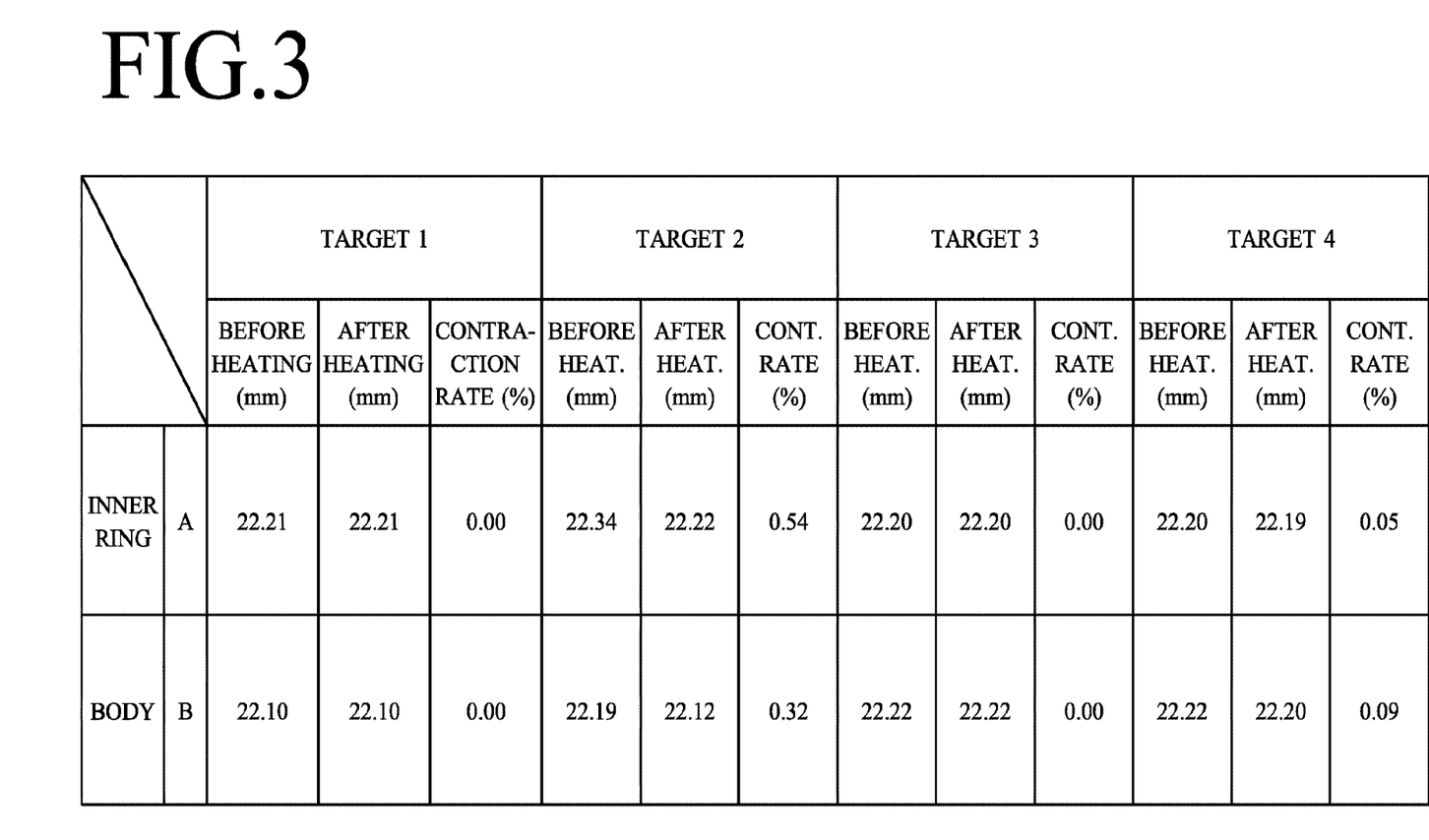
FIG. 3 is a drawing showing sizes of portions of inner rings and bodies in targets 1, 2, 3, and 4 for comparison to the first embodiment of the invention.

FIGS. 2 and 3 show the inner diameters of the outer sleeves of the bodies of the examples 1 and 2 and the targets 1-4, and the outer diameters of the insert portions of the inner rings thereof, which were measured before and after the temperature change, i.e. the heating. FIGS. 2 and 3 also show calculated values of the radial contraction rates of the outer sleeves of the bodies and the insert portions of the inner rings.

Figure 4:
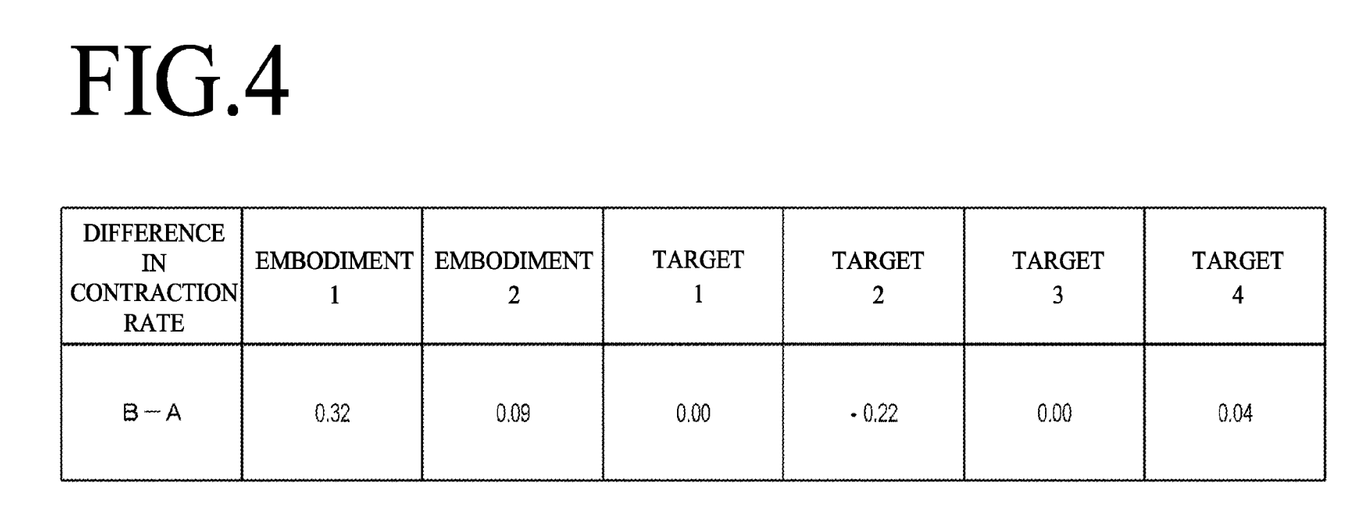
FIG. 4 is a drawing showing contraction rates of inner rings and bodies of the examples 1 and 2, and the targets 1, 2, 3, and 4, based on FIGS. 2 and 3.

FIG. 4 shows differences that are equal to the radial contraction rates of the outer sleeves of the bodies minus the radial contraction rates of the insert portions of the inner rings.

The example 1 has the body made of PFA and the inner ring made of PFA. The body of the example 1 was formed such that its outer sleeve contracts after the heating, and the inner ring thereof was formed such that its insert portion does not contract after the heating. As a result, the outer sleeve of the body has a radial contraction rate 0.32% higher than the insert portion of the inner ring.

The example 2 has the body made of PTFE and the inner ring made of PTFE. The body of the example 2 was formed such that its outer sleeve contracts after the heating, and the inner ring thereof was formed such that its insert portion does not contract after the heating. As a result, the outer sleeve of the body has a radial contraction rate 0.09% higher than the insert portion of the inner ring.

The target 1 has the body made of PFA and the inner ring made of PFA. The body of the target 1 was formed such that its outer sleeve does not contract after the heating, and the inner ring thereof was formed such that its insert portion does not contract after the heating. As a result, the outer sleeve of the body has the same radial contraction rate as the insert portion of the inner ring.

The target 2 has the body made of PFA and the inner ring made of PFA. The body of the target 2 was formed such that its outer sleeve contracts after the heating, and the inner ring thereof was formed such that its insert portion contracts after the heating. As a result, the outer sleeve of the body has a radial contraction rate 0.22% lower than the insert portion of the inner ring.

The target 3 has the body made of PTFE and the inner ring made of PTFE. The body of the target 3 was formed such that its outer sleeve does not contract after the heating, and the inner ring thereof was formed such that its insert portion does not contract after the heating. As a result, the outer sleeve of the body has the same radial contraction rate as the insert portion of the inner ring.

The target 4 has the body made of PTFE and the inner ring made of PTFE. The body of the target 4 was formed such that its outer sleeve contracts after the heating, and the inner ring thereof was formed such that its insert portion contracts after the heating. As a result, the outer sleeve of the body has a radial contraction rate 0.04% higher than the insert portion of the inner ring.

A tube made of PFA was connected to each body of the examples 1 and 2 and the targets 1-4 by the inner ring, and then, the tube, body, and inner ring underwent the heat cycle (change from a room temperature to a high temperature (about 200 degrees Celsius) and return to the room temperature.) Before and after the heat cycle, rates of leakage limit pressure of tubes were measured.

The rates of leakage limit pressure of tubes were obtained by comparison among measured values of leakage limit pressure of tubes after the zeroth to fifth times of the heat cycle. More specifically, the rates are defined as the measured values of leakage limit pressure after the first to fifth times of the heat cycle divided by the measured value of leakage limit pressure before the heat cycle, i.e. after the zeroth time of the heat cycle.

Figure 5:
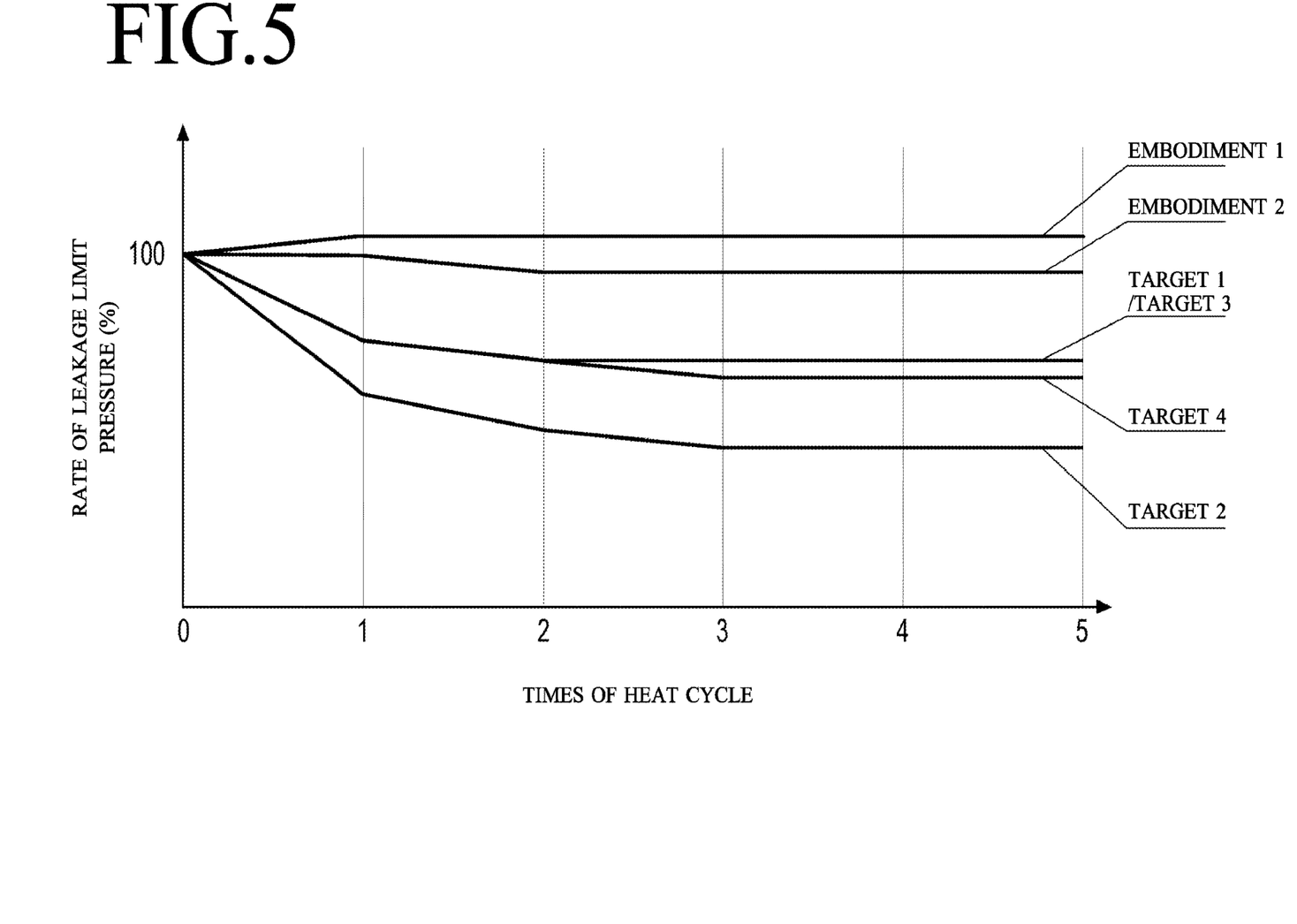
FIG. 5 is a drawing showing seal performance of the embodiments 1 and 2, and the targets 1, 2, 3, and 4.

The measured values shown in FIG. 5 reveals that the rates of leakage limit pressure of tubes in the examples 1 and 2 are higher than those in the targets 1-4. In other words, the measured values clarify that the first embodiment of the invention enables the fitting to maintain its good seal performance even if the fitting undergoes the heat cycle repeatedly.

The following will explain a second embodiment of the invention with reference to drawings.

Figure 6:
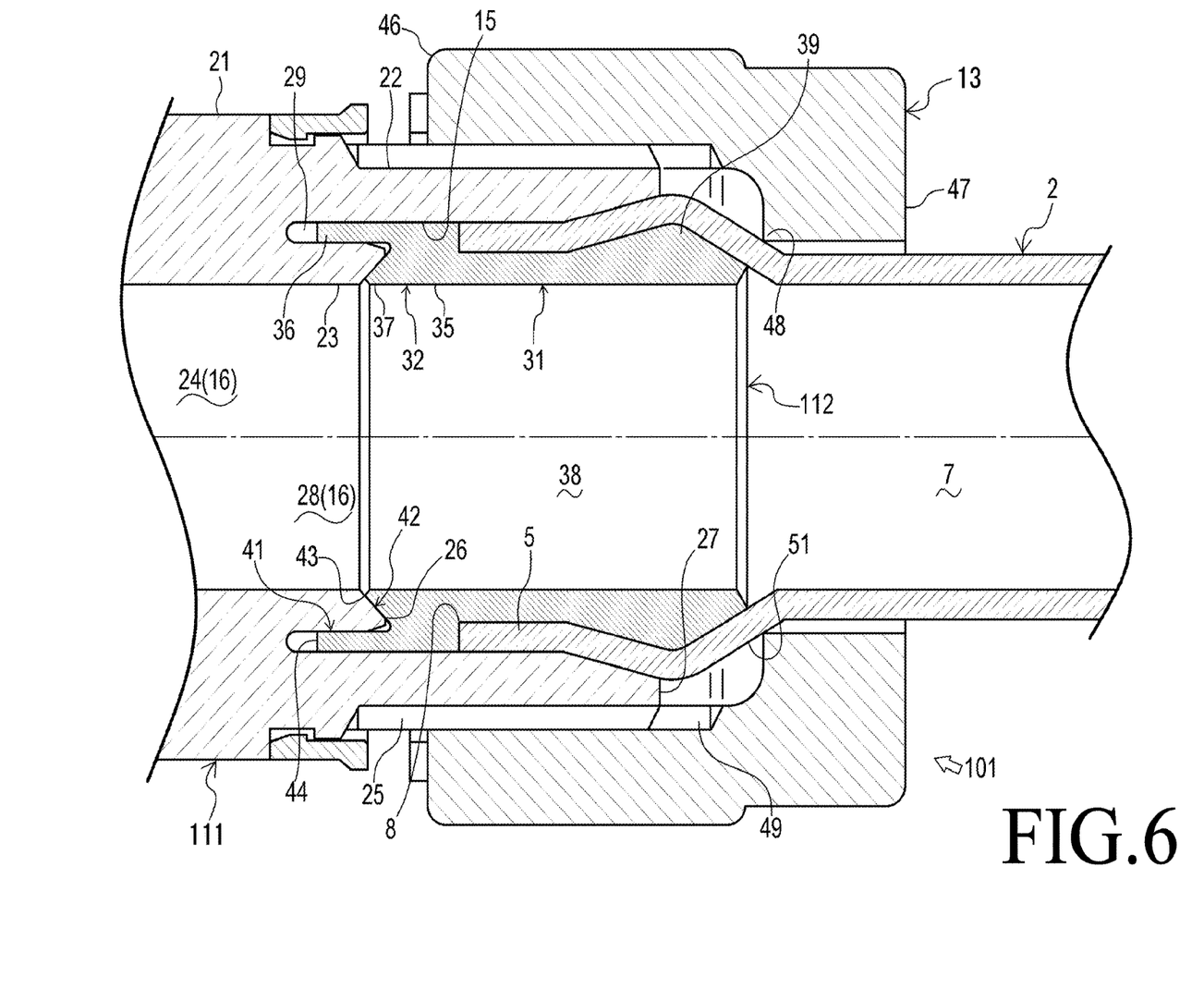
FIG. 6 is a cross-section view of the structure of a joint between a resin tube fitting according to the second embodiment of the invention and a longitudinal end of the tube.

A resin tube fitting 101 according to the second embodiment of the invention differs from the fitting 1 according to the first embodiment in that the body 111 and the inner ring 112 are made from different kinds of resin. Except for the difference, the resin tube fitting 101 according to the second embodiment is substantially the same as the fitting 1 according to the first embodiment. Accordingly, as shown in FIG. 6, components of the resin tube fitting 101 are marked with the same reference symbols as substantially equivalent components of the resin tube fitting 1 according to the first embodiment, and details of the components are omitted.

The resin tube fitting 101 has the body 111 and the inner ring 112 that are made of different kinds of resin, which have a property of contracting caused by change in ambient temperature. The outer sleeve 22 of the body 111 is designed to have a radial contraction rate higher by 0.09% or more than the insert portion 32 of the inner ring 112, esp. the plug 36. In other words, the resin from which the body 111 is made has a contraction rate after molded higher than the resin from which the inner ring 112 is made.

The different kinds of resin have different names, or alternatively the same name but different grades. Since resins of different grades have different molecular structures, molecular weights, or crystallinity degrees, the resins can have different melt flow rates (MFRs) at molding, flexing lives (resistances to bending) after molded, and the likes, which can cause difference in contraction rate of molded objects. Thus, the body 111 and the inner ring 112 made from resins of different grades can have contraction rates with significant difference, i.e. 0.09% or more.

The body 111 and the inner ring 112 are made from their respective resins, preferably fluoropolymers, which include, for example, PFA, PTFE, or ETFE.

The body 111 is heated by rise in ambient temperatures (including the temperature of fluid flowing inside the resin tube fitting 101) from a room temperature (approximately 25 degrees Celsius) by certain degrees, and then cooled by fall in ambient temperature to the room temperature. When undergoing such a temperature change for the first time, the outer sleeve 22 can radially contract relative to its initial size.

The inner ring 112 is heated by rise in ambient temperatures (including the temperature of fluid flowing inside the resin tube fitting 101) from a room temperature by certain degrees, and then cooled by fall in ambient temperature to the room temperature. When undergoing such a temperature change for the first time, the insert portion 32 can radially contract relative to its initial size.

Namely, the body 111 and the inner ring 112, including the outer sleeve 22 and the insert portion 32, expand relative to their initial sizes during heating, i.e. when they receive a certain amount of heat with rise in ambient temperature, and then contract relative to their initial sizes during cooling, i.e. when they lose heat with fall in ambient temperature.

The outer sleeve 22 of the body 111 is designed to radially contract greater than the insert portion 32 of the inner ring 112.

Since the body 111 and the inner ring 112 are made from different kinds of resin, the outer sleeve 22 of the body 111 and the insert portion 32 of the inner ring 112 can have radial contraction rates with a certain difference. In addition, heat treatment or adjustment of molding conditions may increase the difference in contraction rate. Concretely, the inner ring 112 may undergo heat treatment such that it has zero contraction rate after the temperature change, i.e. hardly contract, and thus the body 111 and the inner ring 112 may have radial contraction rates with a larger difference therebetween.

The heat treatment is, for example, an annealing treatment to eliminate internal distortion from objects molded during manufacture of the inner ring 112. In the annealing treatment, the objects are heated at a certain temperature for a certain time (e.g., the objects made of PFA or PTFE are heated from about 200 degrees Celsius to about 250 degrees Celsius for about 180 minutes; the objects made of ETFE are heated from about 120 degrees Celsius to about 140 degrees Celsius for about 180 minutes.)

The difference in radial contraction rate between the outer sleeve 22 of the body 111 and the insert portion 32 of the inner ring 112 is designed within a range from about 0.09% to about 10%. Preferably, the difference is selected within a range from about 0.09% to about 5%.

The above-described configuration enables the outer sleeve 22 of the body 111 to contract greater than the insert portion 32 of the inner ring 112 when the body 111 and the inner ring 112, with the tube 2 connected to the resin tube fitting 101, are cooled after heated by heat transmitted from the fluid, i.e have undergone the heat cycle.

After the heat cycle, the inner diameter of the outer sleeve 22 is reduced greater than the outer diameter of the insert portion 32. Thus, the fitting 1 can press the outer sleeve 22 onto the insert portion 32, which radially overlap the outer sleeve 22.

Thus, the fitting 101 can improve its capability to seal the gap between the outer sleeve 22 of the body 111 and the insert portion 32 of the inner ring 112 so that the capability can be maintained at a good level even after the fitting 101 is subject to a temperature higher than a room temperature. In short, the fitting 101 can improve the capability to seal the gap between the body 111 and the inner ring 112.

As described above, the body 111 includes the main sleeve 21, the outer sleeve 22, the inner sleeve 23, and the groove 29. The outer sleeve 22 protrudes coaxially from the main sleeve 21 in the first axial direction. The inner sleeve 23 is disposed at inner radiuses of the outer sleeve 22 and protrudes coaxially from the main sleeve 21 to the same direction as the outer sleeve 22 such that the tip 26 of the inner sleeve 23 is located nearer to the main sleeve 21 than the tip 27 of the outer sleeve 22. The groove 29 is surrounded by the main sleeve 21, outer sleeve 22, and inner sleeve 23 to be open to the first axial direction.

When the insert portion 32 and at least part of the press-in portion 31 are put inside the outer sleeve 22, the inner ring 112 allows the insert portion 32, esp. the plug 36, to be pressed into the groove 29 to form the first seal area 41 with radial seal action between the insert portion 32, esp. the plug 36, and the inner sleeve 23.

Accordingly, the fitting 101 enables the outer sleeve 22 of the body 111, when it contracts after the heat cycle, to press the insert portion 32, esp. the plug 36, which is pressed into the groove 29, onto the inner sleeve 23. Thus, the fitting 101 can enhance the force of the insert portion 32 and the inner sleeve 23 to radially press each other.

Thus, the fitting 101 can improve the seal performance of the first seal area 41 formed between the inner sleeve 23 of the body 111 and the insert portion 32 of the inner ring 112, esp. the plug 36, so that the seal performance can be maintained at a good level even after the fitting 101 is subject to a temperature higher than a room temperature. As a result, the fitting 101 can improve the capability to seal the gap between the body 111 and the inner ring 112.

The above-described advantageous effects were confirmed by comparative experiments about seal performance. We started the comparative experiments by preparing examples 3, 4, and 5 of the second embodiment of the invention and targets 5, 6, and 7 for comparison; the targets have the same structure as the resin tube fitting 101, but their bodies and inner rings differ in difference in contraction rate from those according to the second embodiment of the invention.

Ambient temperatures of the examples 3-5 and the targets 5-7 were increased from a room temperature to about 200 degrees Celsius, and then kept at about 200 degrees Celsius for 1 hour. After that, the ambient temperatures were decreased from about 200 degrees Celsius to a room temperature, i.e. the examples 3-5 and the targets 5-7 were naturally cooled.

The heating and natural cooling were conducted for the examples 3-5 and the targets 5-7 before connected to tubes, i.e. with the bodies and inner rings separated from each other.

Figure 7:
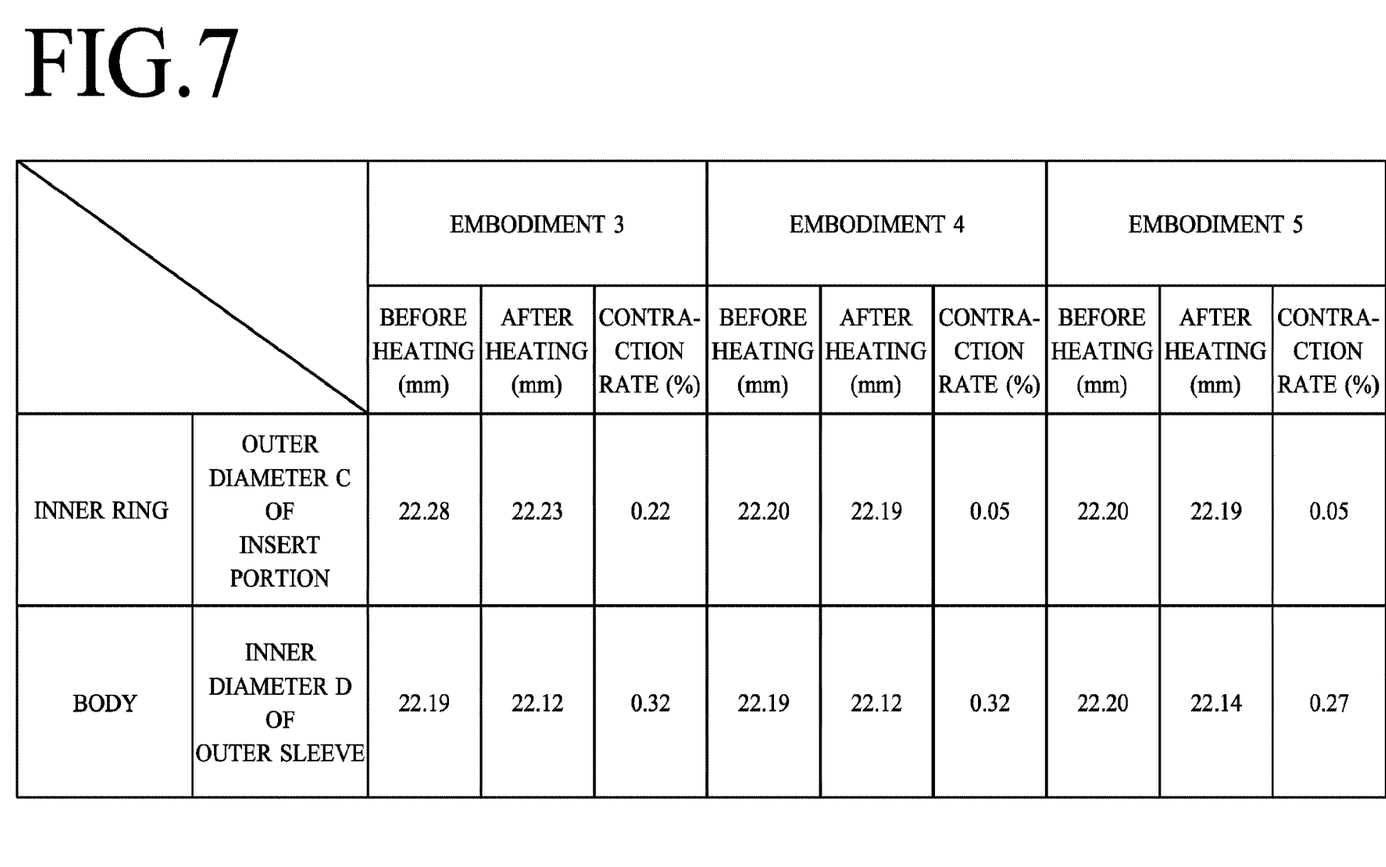
FIG. 7 is a drawing showing sizes of portions of inner rings and bodies in examples 3 and 4 according to the second embodiment of the invention.
Figure 8:
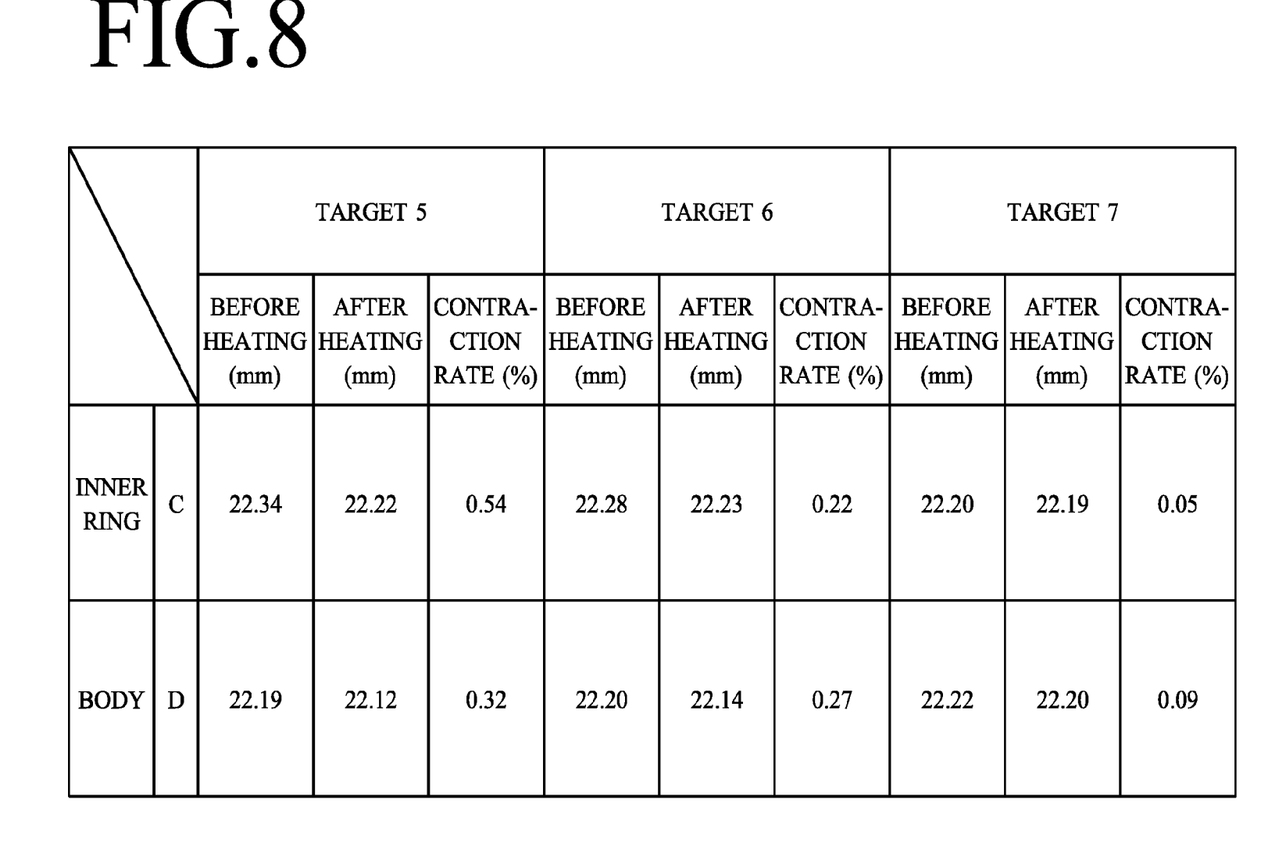
FIG. 8 is a drawing showing sizes of portions of inner rings and bodies in targets 5, 6, and 7 for comparison to the second embodiment of the invention.

FIGS. 7 and 8 show the inner diameters of the outer sleeves of the bodies of the examples 3-5 and the targets 5-7, and the outer diameters of the insert portions of the inner rings thereof, which were measured before and after the temperature change, i.e. the heating. FIGS. 7 and 8 also show calculated values of the radial contraction rates of the outer sleeves of the bodies and the insert portions of the inner rings.

Figure 9:
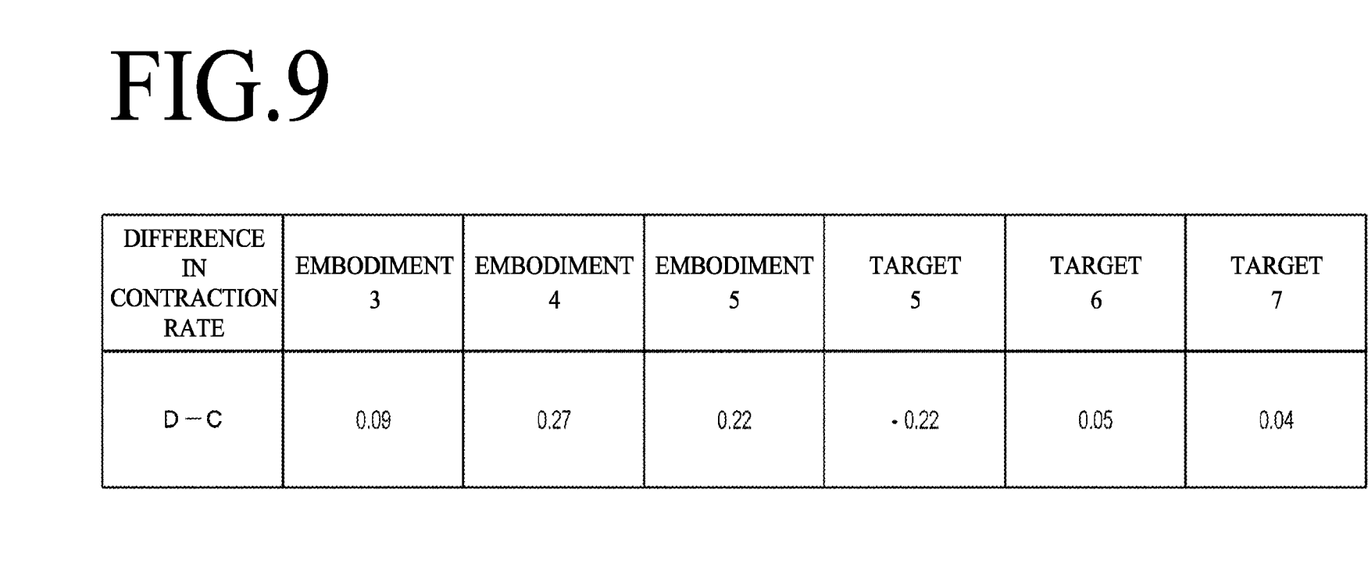
FIG. 9 is a drawing showing contraction rates of inner rings and bodies of the examples 3 and 4, and the targets 5, 6, and 7, based on FIGS. 7 and 8.

FIG. 9 shows differences that are equal to the radial contraction rates of the outer sleeves of the bodies minus the radial contraction rates of the insert portions of the inner rings.

The example 3 has the body made of PFA and the inner ring made of ETFE. The outer sleeve of the body has a radial contraction rate 0.09% higher than the insert portion of the inner ring.

The example 4 has the body made of PFA and the inner ring made of PTFE. The outer sleeve of the body has a radial contraction rate 0.27% higher than the insert portion of the inner ring.

The example 5 has the body made of ETFE and the inner ring made of PTFE. The outer sleeve of the body has a radial contraction rate 0.22% higher than the insert portion of the inner ring.

The target 5 has the body made of PFA and the inner ring made of PFA. The outer sleeve of the body has a radial contraction rate 0.22% lower than the insert portion of the inner ring.

The target 6 has the body made of ETFE and the inner ring made of ETFE. The outer sleeve of the body has a radial contraction rate 0.05% higher than the insert portion of the inner ring.

The target 7 has the body made of PTFE and the inner ring made of PTFE. The outer sleeve of the body has a radial contraction rate 0.04% higher than the insert portion of the inner ring.

A tube made of PFA was connected to each body of the examples 3-5 and the targets 5-7 by the inner ring, and then, the tube, body, and inner ring underwent the heat cycle (change from a room temperature to a high temperature (about 200 degrees Celsius) and return to the room temperature.) Before and after the heat cycle, rates of leakage limit pressure of tubes were measured.

The rates of leakage limit pressure of tubes were obtained by comparison among measured values of leakage limit pressure of tubes after the zeroth to fifth times of the heat cycle. More specifically, the rates are defined as the measured values of leakage limit pressure after the first to fifth times of the heat cycle divided by the measured value of leakage limit pressure before the heat cycle, i.e. after the zeroth time of the heat cycle.

Figure 10:
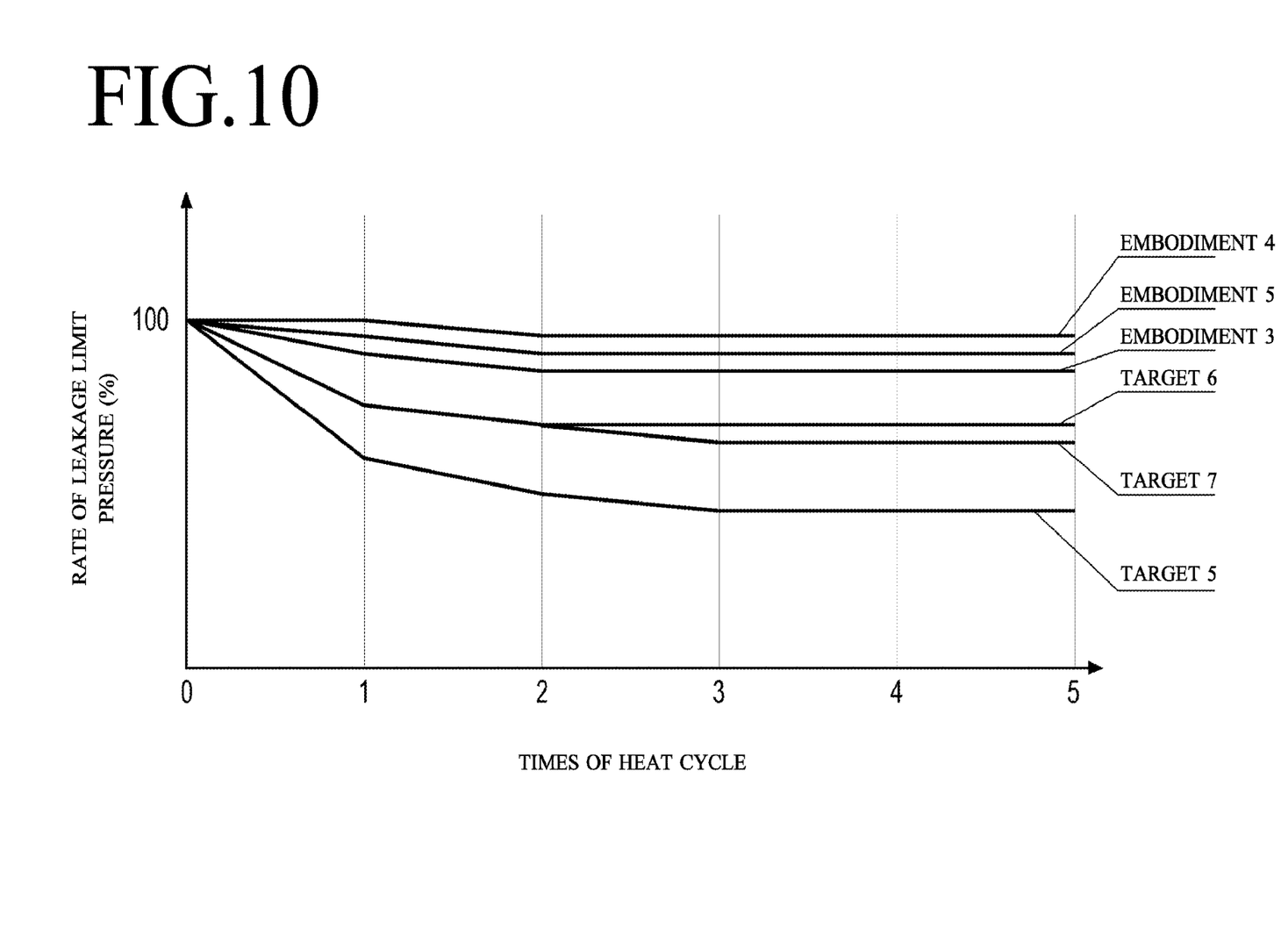
FIG. 10 is a drawing showing seal performance of the embodiments 3 and 4, and the targets 5, 6, and 7.

The measured values shown in FIG. 10 reveals that the rates of leakage limit pressure of tubes in the examples 3-5 are higher than those in the targets 5-7. In other words, the measured values clarify that the second embodiment of the invention enables the fitting to maintain its good seal performance even if the fitting undergoes the heat cycle repeatedly.

In view of the explanation described above, the invention can obviously have variations and modifications. Accordingly, it should be understood that the invention may have embodiments other than those in the description within the scope of the claims attached to the description.

DESCRIPTION OF REFERENCE SYMBOLS 1 resin tube fitting, 2 tube, 5 one longitudinal end of the tube, 11 body, 12 inner ring, 13 union nut, 22 outer sleeve, 31 press-in portion, 32 insert portion, 101 resin tube fitting, 111 body, 112 inner ring.

What is claimed is:

1. A resin tube fitting connectable to a tube, comprising:
a body including an outer sleeve;
an inner ring including an insert portion insertable into the outer sleeve to contact the outer sleeve radially, and a press-in portion configured to be pressed into a longitudinal end of the tube; and
a union nut configured to be engageable with the body to maintain the insert portion within the outer sleeve, wherein:
the body and the inner ring are made of resin, which has a property of, when ambient temperature rises from room temperature and then falls to the room temperature, contracting to a size smaller than an initial size before the ambient temperature rises from the room temperature; and
the outer sleeve of the body and the insert portion of the inner ring are designed to, when the ambient temperature rises from the room temperature and then falls to the room temperature, radially contract at different rates relative to initial sizes before ambient temperature rises from the room temperature, and the rate of the outer sleeve is higher by 0.09% or more than the rate of the insert portion.

2. The resin tube fitting according to claim 1, wherein the body and the inner ring are made of the same resin, and
the inner ring has been heat-treated during manufacture so that the rate of the insert portion is 0.00%, and,
the body has not been heat-treated during manufacture so that the rate of the outer sleeve is 0.09% or more.

3. The resin tube fitting according to claim 1, wherein the body and the inner ring are made of different kinds of resin that contract at different rates when ambient temperature rises from room temperature and then falls to the room temperature.

4. The resin tube fitting according to claim 1, wherein the body comprises:
a main sleeve from which the outer sleeve protrudes coaxially in a first axial direction;
an inner sleeve placed radially inside the outer sleeve and protruding from the main sleeve coaxially with the outer sleeve in the first axial direction such that a tip of the inner sleeve is positioned nearer to the main sleeve than a tip of the outer sleeve; and
a groove surrounded by the main sleeve, the outer sleeve, and the inner sleeve to have an opening at an end in the first axial direction, and
the inner ring allows the insert portion to be pressed into the groove such that a first seal area with radial seal action is formed between the insert portion and the inner sleeve when the insert portion is inserted into the outer sleeve.

\* \* \* \* \*